(12) United States Patent
Umetsu et al.

(10) Patent No.: US 8,799,508 B2
(45) Date of Patent: Aug. 5, 2014

(54) NODE DEVICE, INFORMATION COMMUNICATION METHOD AND COMPUTER READABLE RECORDING MEDIUM

(75) Inventors: Tsubasa Umetsu, Chiryu (JP); Kentaro Ushiyama, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 122 days.

(21) Appl. No.: 13/428,499

(22) Filed: Mar. 23, 2012

(65) Prior Publication Data

US 2013/0054832 A1    Feb. 28, 2013

(30) Foreign Application Priority Data

Aug. 31, 2011 (JP) ................. 2011-188794

(51) Int. Cl.
*G06F 15/173* (2006.01)
(52) U.S. Cl.
USPC ........... 709/238; 709/239; 709/240; 709/241; 709/242; 709/243; 709/244
(58) Field of Classification Search
USPC .......... 709/238, 239, 240, 241, 242, 243, 244
See application file for complete search history.

(56) References Cited

U.S. PATENT DOCUMENTS

| | | | |
|---|---|---|---|
| 7,035,261 B2 * | 4/2006 | Ogawa et al. | 370/392 |
| 7,492,708 B2 * | 2/2009 | Ge et al. | 370/229 |
| 7,574,522 B2 * | 8/2009 | Oguchi | 709/238 |
| 7,609,717 B2 * | 10/2009 | Miyata et al. | 370/466 |
| 8,130,700 B2 * | 3/2012 | Flammer et al. | 370/328 |
| 2005/0015497 A1 | 1/2005 | Yokota et al. | |
| 2006/0047786 A1 | 3/2006 | Doi | |
| 2006/0062248 A1 * | 3/2006 | Huang et al. | 370/466 |
| 2007/0283043 A1 | 12/2007 | Kiyohara et al. | |

(Continued)

FOREIGN PATENT DOCUMENTS

| | | |
|---|---|---|
| JP | A-2004-236096 | 8/2004 |
| JP | A-2004-357301 | 12/2004 |

(Continued)

OTHER PUBLICATIONS

Chroboczek, "BitTorrent DHT Extensions for IPv6," Nov. 20, 2009, <http://www.bittorrent.org/beps/bep_0032.html>.

(Continued)

*Primary Examiner* — Liangche A Wang
*Assistant Examiner* — Cheikh Ndiaye
(74) *Attorney, Agent, or Firm* — Oliff PLC

(57) ABSTRACT

A node device in an information communicating system: determines whether or not the node device is communicable over the IPv4; determines whether or not the node device is communicable over the IPv6; acquires a first routing table that is generated using a first node device communicable over the IPv4 from a predetermined device that is connected to a network if communication is possible over the IPv4; and acquires a second routing table that is generated using a second node device communicable over the IPv6 from the predetermined device that is connected to the network if communication is possible over the IPv6. If the controller determines that communication is possible over the IPv4 and the controller determines that communication is possible over the IPv6, the controller acquires one of the first one of the first routing table and the second routing table according to a priority order.

8 Claims, 4 Drawing Sheets

(56) References Cited

U.S. PATENT DOCUMENTS

| | | |
|---|---|---|
| 2009/0043889 A1 | 2/2009 | Gobara et al. |
| 2010/0306303 A1 | 12/2010 | Matsuo |
| 2011/0072088 A1 | 3/2011 | Kiyohara |

FOREIGN PATENT DOCUMENTS

| | | |
|---|---|---|
| JP | A-2005-333374 | 12/2005 |
| JP | A-2006-197400 | 7/2006 |
| JP | A-2006-203610 | 8/2006 |
| JP | A-2008-217135 | 9/2008 |
| JP | A-2011-10288 | 1/2011 |
| JP | A-2011-71643 | 4/2011 |
| JP | A-2011-109591 | 6/2011 |

OTHER PUBLICATIONS

Wing et al., "Happy Eyeballs: Trending Towards Success with Dual-Stack Hosts, draft-wing-v6ops-happy-eyeballs-ipv6-01," Oct. 25, 2010, <http://tools.ietf.org/html/draft-wing-v6ops-happy-eyeballs-ipv6-01>.

Japanese Office Action issued in Japanese Patent Application No. 2011-188794 dated Jul. 2, 2013 (w/ partial translation).

* cited by examiner

NODE DEVICE, INFORMATION COMMUNICATION METHOD AND COMPUTER READABLE RECORDING MEDIUM

CROSS-REFERENCE TO RELATED APPLICATION

This application is based upon and claims the benefit of priority of Japanese Patent Application No. 2011-188794 filed on Aug. 31, 2011, the contents of which are incorporated herein by reference in its entirety.

BACKGROUND

The present disclosure relates to a technical field of a peer-to-peer (P2P) communication system having a plurality of node devices that are communicable with one another through a network.

Recently, a peer-to-peer communication system has been attracting attention. The peer-to-peer communication system has been attracting attention as a new form of change to a server-client system which is in the form of the current mainstream in content transfer. In the peer-to-peer communication system, requests for content do not concentrate to a server device of a center. Because of this, in comparison to the server-client system, it is possible to acquire the content in a short time. Specifically, a technology of generating routing table of a plurality of DHTs (Distributed Hash Tables) for each group in the unit of software has been disclosed. Further, a technology of generating routing tables at each point using a node device connected to each point has been disclosed.

SUMMARY

Recently, due to the depletion of address resources of IPv4 (Internet Protocol Version 4), migration to IPv6 (Internet Protocol Version 6) is under progress. In the process of migrating from IPv4 to IPv6, it is considered that both protocols of IPv4 and IPv6 coexist on the network. When the P2P (Peer-to-Peer) system operates in a network environment in which IPv4 and IPv6 coexist, an overlay network, on which node devices communicable over IPv4 and node devices communicable over IPv6 coexist, is created. In the related art, it is necessary to determine root nodes for content in the overlay network. In this case, in one overlay network, it is necessary to determine two types of root nodes including a root node communicable over IPv4 and a root node communicable over IPv6. However, in the related art, an IPv4 root node and an IPv6 root node may not be uniquely determined in one overlay network. Accordingly, since the protocol is different between IPv6 and IPv4, the content cannot be acquired and thus the P2P system cannot be operated.

Accordingly, an aspect of the present disclosure has been made in consideration of the above-described situations, and an object to be solved is to provide a node device, information communication method and program, which can operate a P2P system without the necessity of setting a root node communicable over IPv4 and a root node communicable over IPv6 in one overlay network even in a network environment in which IPv4 and IPv6 coexist.

The aspect of the present disclosure provides the following arrangements.

A node device comprising a controller configured to:
  determine whether or not the node device is communicable over IPv4 (Internet Protocol Version 4);
  determine whether or not the node device is communicable over IPv6 (Internet Protocol Version 6);
  acquire a first routing table that is generated using information of a first node device communicable over the IPv4 from a predetermined device via a network, if the controller determines that communication is possible over the IPv4; and
  acquire a second routing table that is generated using information of a second node device communicable over the IPv6 from the predetermined device via the network if the controller determines that communication is possible over the IPv6,
  wherein if the controller determines that communication is possible over the IPv4 and the controller determines that communication is possible over the IPv6, the controller acquires one of the first one of the first routing table and the second routing table according to a priority order.

A non-transitory computer readable recording medium storing a program causing a computer of a node device to execute:
  determining whether or not the node device is communicable over IPv4 (Internet Protocol Version 4);
  determining whether or not the node device is communicable over IPv6 (Internet Protocol Version 6); and
  acquiring one of a first routing table that is generated using information of a first node device communicable over the IPv4 and a second routing table that is generated using information of the second node device communicable over the IPv6 from a predetermined device via a network according to a predetermined priority order if it is determined that communication is possible over the IPv4 and it is determined that communication is possible over the IPv6.

An information communication method, comprising:
  determining whether or not the node device is communicable over IPv4 (Internet Protocol Version 4);
  determining whether or not the node device is communicable over IPv6 (Internet Protocol Version 6); and
  acquiring one of a first routing table that is generated using information of the first node device communicable over the IPv4 and a second routing table that is generated using information of the second node device communicable over the IPv6 from a predetermined device via a network according to a predetermined priority order if it is determined that communication is possible over the IPv4 and it is determined that communication is possible over the IPv6.

DESCRIPTION OF EXEMPLARY EMBODIMENTS

Hereinafter, preferred embodiments of the present invention will be described in detail with reference to the drawings. The embodiments described below are embodiments of the case where the present invention is applied to a peer-to-peer information communicating system.

General Configuration of Information Communicating System S

Figure 1:
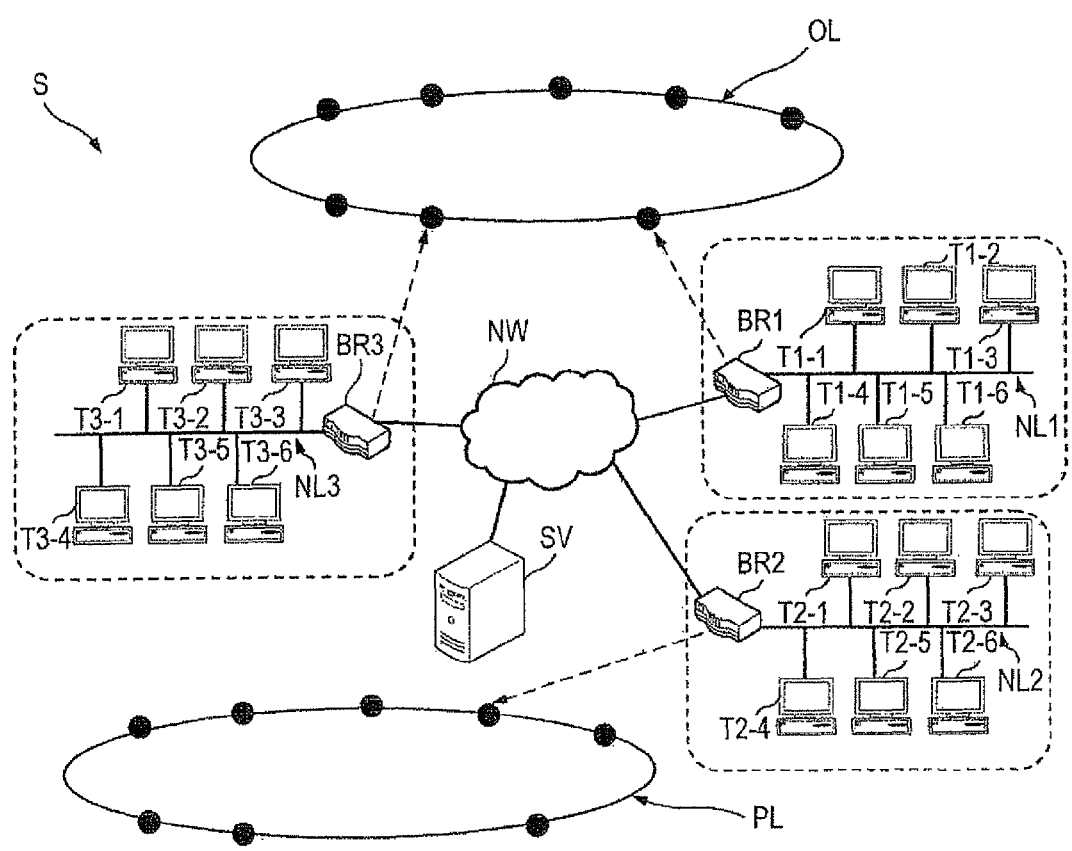
FIG. 1 is an overview diagram of an information communicating system according to an embodiment of the present invention.

First, referring to FIG. 1, a general configuration of an information communicating system S according to an embodiment of the present invention will be described. As illustrated in FIG. 1, the information communicating system S may include a plurality of broadband routers BR (BR1, BR2, BR3) and terminal devices Tm-n (m is one of 1, 2, 3, . . . , and n is one of 1, 2, 3, . . . ). The terminal devices Tm-n are communicable with one another through a network NW. This network NW is a communication network in this world. For example, the network is the Internet.

The network NW is a network to interconnect respective point networks NLm. The network NW, for example, may be the Internet or a WAN (Wide Area Network). Further, the network NW, for example, may be built by an IX (Internet Exchange), an ISP (Internet Service Provider), a device of a DSL (Digital Subscriber Line) provider, a device of a FTTH (Fiber To The Home) provider, a communication line, and the like. On the other hand, the network NW may be a dedicated network of the information communicating system S.

In an embodiment, one or more point networks NLm may be formed in the network NW. Further, a broadband router BR is connected to each point network NLm. Further, a plurality of terminal devices Tm-n are connectable to the broadband router BR of each point. The point network NLm may be a network built in a site of each point m. The point, for example, may be a company, a school, a hospital, or a crammer. The point network NLm, for example, may be built by a LAN or the like. The point network NLm may be a network built to interconnect a plurality of LANs. In this case, the plurality of LANs may be connected through a network device such as a router or the like. The network in which the plurality of LANs may be interconnected, for example, may be a CAN (Campus Area Network). A broadband router BR may be connected to each point network NLm. Instead of the broadband router BR, a firewall may be connected. The broadband router BR may be a communication device that enables the terminal device Tm-n connected in the point and another terminal device Tm-n except for the terminal device Tm-n connected to the point to be communicable with each other. The firewall or broadband router BR is known, and the detailed description thereof will be omitted. Either of the broadband router BR and the firewall may be to be installed at a point is optionally determined for each point. In an embodiment, the point network NLm, for example, may be a LAN (Local Area Network).

Further, a center server SV may be connectable to the network NW. The center server SV stores the original of content data that is sent or received through a first overlay network OL or a second overlay network PL. Further, the center server SV may transmit content catalog information to the broadband router BR. The details of the content catalog information will be described later. The center server SV may manage a content ID that is used to input the content data to the first overlay network OL or the second overlay network PL. Here, the input of the content data means that the terminal device Tm-n may be sent to the state where the content data can be acquired from the broadband router BR. On the other hand, the content data is called "content". The details of the center server SV will be described later.

Each broadband router BR may be allocated with a unique serial number and an IP (Internet Protocol) address. Further, each broadband router BR that is connected to the information communicating system S may be allocated with a node ID that is unique identification information composed of a predetermined number of digits. In the information communicating system S according to an embodiment, the first overlay network OL and the second overlay network PL for content transfer may be built. The first overlay network OL and the second overlay network PL may be overlay networks built on the network NW. In other words, the first overlay network OL and the second overlay network PL may be logical networks created on a physical network. Further, the first overlay network OL and the second overlay network PL may be realized by a specified algorithm, for example, an algorithm using a distributed hash table. The distributed hash table is hereinafter called a "DHT (Distributed Hash Table)". On the other hand, a routing table using a DHT is well known in US2007283043 (A1). On the other hand, the broadband router BR according to an embodiment is an example of a node device. In an embodiment, the first overlay network OL may be configured by a node device that is communicable over IPv4 (Internet Protocol Version 4). Further, the second overlay network PL may be configured by a node device that is communication over IPv6 (Internet Protocol Version 6. On the other hand, the node device according to an embodiment may participate in anyone of the first overlay network OL and the second overlay network PL.

Regarding a Method of Participating in the First Overlay Network OL and the Second Overlay Network PL Hereinafter, referring to FIG. 2, a method of participating in the first overlay network OL and the second overlay network PL will be described. In the following description of the method of participating in the first overlay network OL and the second overlay network PL, the broadband router BR is merely called a node device.

The connection to the information communicating system S may be performed in a manner that a node device that is not connected to the information communicating system S transmits a participation message, which indicates a request to participate in the information communicating system S, to an arbitrary device being connected. The participation in the information communicating system S means that the node device is connected to the information communicating system S and becomes in a state where the node device can acquire the content from the information communicating system S. That is, the participation in the first overlay network OL or the second overlay network PL means that the node device operates in a state where the node device can transmit/receive various kinds of content to/from another node through the first overly network OL or the second overlay network PL on the basis of a routing table using the DHT. An arbitrary node device may be a contact node that is always connected to the information communicating system S. The node device that intends to participate in the information communicating system S can acquire the routing table of the DHT from the contact node through transmission of a participation message to the contact node. On the other hand, in an embodiment, two contact nodes, that is, a first contact node communicable over IPv4 and a second contact node communicable over IPv6, may exist. Instead of installing two contact nodes of the first contact node and the second contact node, the center server SV may function as the first contact node and the second contact node. In this case, the center server SV may become a server device that is communicable over both IPv4 and IPv6. On the other hand, according to an embodiment, the first contact node may store a first routing table, and the second contact node stores a second routing table. Further, in the case of using the center server SV instead of installing two contact nodes of the first contact node and the second contact node, the center server SV may store the first routing table and the second routing table. On the other hand, the details of the first routing table and the second routing table will be described later.

Figure 2:
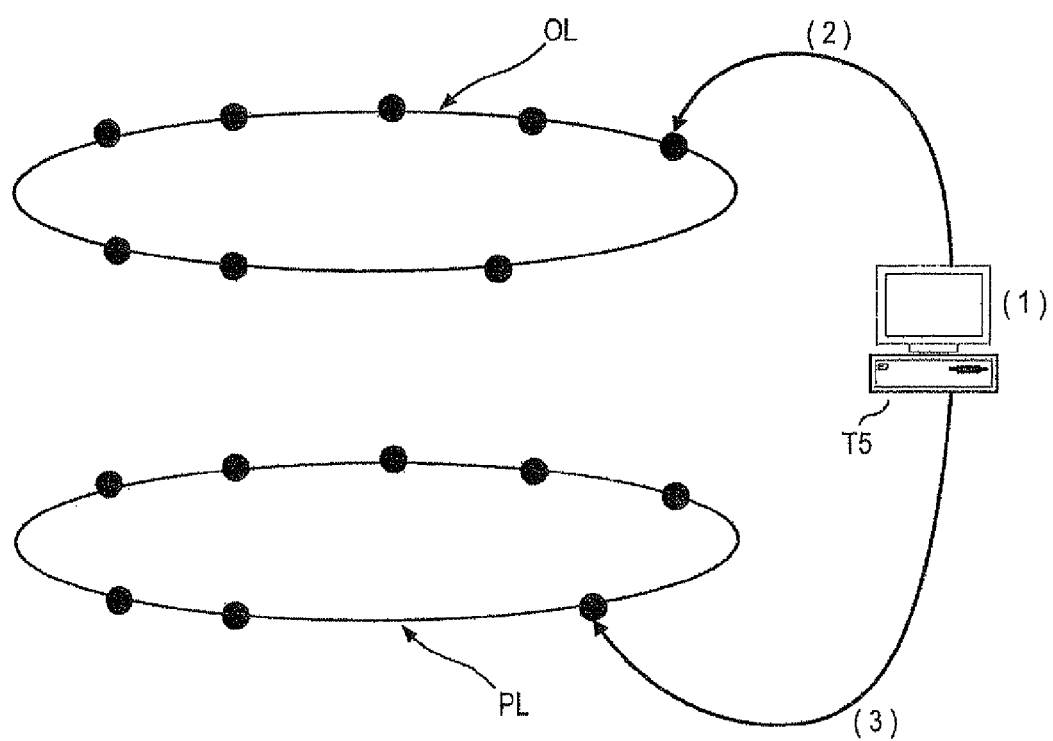
FIG. 2 is an explanatory diagram explaining a participation process according to an embodiment of the present invention.

In FIG. 2, first, a node device T5 that is not connected to the information communicating system S may determine whether or not the node device is communicable over IPv4 (FIG. 2: (1)). Further, the node device T5 may determine whether or not the node device is communicable over IPv6 (FIG. 2: (1)).

If it is determined that the node device T5 is communicable over IPv4 only, the node device T5 may transmit a participation message to the first contact node in order to participate in the first overlay network OL (FIG. 2: (2)). Then, the node device T5 may acquire the first routing table from the first contact node. The first routing table may be a routing table that is communicable with the node device that is connected to the first overlay network OL. Further, if it is determined that the node device T5 is communicable over IPv6 only, the node device T5 may transmit the participation message to the second contact node in order to participate in the second overlay network PL (FIG. 2: (3)). Then, the node device T5 may acquire the second routing table from the second contact node. The second routing table may be a routing table that is communicable with the node device that is connected to the second overlay network PL.

Further, if it is determined that the node device T5 is communicable over both IPv4 and IPv6, the node device T5 may transmit the participation message to one of the first contact node and the second contact node in order to participate in one of the first overlay network OL and the second overlay network PL. Specifically, the node device T5 may participate in only one of the first overlay network OL and the second overlay network PL according to a predetermined priority order. If the node device T5 participates in the first overlay network OL, the node device T5 may discard the message that is sent from the node device that participates in the second overlay network PL. On the other hand, if the node device T5 participates in the second overlay network PL, the node device T5 may discard the message that is sent from the node device that participates in the first overlay network OL.

As a result, by building the two overlay networks of the IPv4 overlay network and the IPv6 overlay network, it is not necessary to uniquely determine the IPv4 root node and the IPv6 root node in one overlay network. Further, since even a node device, which is communicable over both IPv6 and IPv4, transmits/receives information to/from the routing table that is communicable over one Internet protocol of IPv4 and IPv6, problems that the content cannot be acquired due to the different protocol between IPv6 and IPv4 do not occur. Accordingly, the information communicating system can be efficiently operated. Further, since a message, which is unnecessary to the overlay network built by a node device having different protocol from the communicable Internet protocol, is not sent, an unnecessary message is not sent in the network. Accordingly, the network band of the information communicating system can be efficiently used.

In an embodiment, since the priority is given to IPv4 rather than IPv6 as a predetermined priority order, the priority may be given to the first overlay network OL rather than the second overlay network PL, and thus the node device T5 participates in the first overlay network OL. On the other hand, as a modified example of an embodiment, since the priority is given to IPv6 rather than IPv4 as a predetermined priority order, the priority may given to the second overlay network PL rather than the first overlay network OL, and thus the node device T5 may participate in the overlay network PL. Further, in order to determine the priority order, a setup file, that indicates which of the first overlay network OL and the second overlay network PL the node device T5 participates in, may be distributed to the node device T5. In this case, when software to perform the processing operation in the information communicating system S is acquired by the node device T5, the setup file may be also acquired. In the case where the setup file is generated by the center server SV, the priority order may be set based on the number of node devices connected to the information communicating system S. For example, if the number of node devices that participate in the first overlay network OL is larger than the number of node devices that participate in the second overlay network PL, the priority of the second overlay network PL may be set to be higher than that of the first overlay network OL in order to make the node device participate in the second overlay network PL. Further, if the number of node devices that participate in the second overlay network PL is larger than the number of node devices that participate in the first overlay network. OL, the priority of the first overlay network OL may be set to be higher than that of the second overlay network PL in order to make the node device participate in the first overlay network OL. As described above, by dynamically switching the priority order, the communication operation of the first overlay network OL and the second overlay network PL becomes stable.

Further, as the priority, the node device may preferentially participate in the overlay network having high uploaded load. In this case, the center server SV periodically may measure upload amounts of the first overlay network OL and the second overlay network PL. Further, information indicating that the node device preferentially participates in the overlay network having large upload amount being measured may be described in the setup file. Through this, since the node device can preferentially participate in the overlay network having high uploaded load, the uploaded load can be lowered. Accordingly, the communication operation of the information communicating system S becomes stable.

Regarding Details of a Routing Table

Hereinafter, details of a routing table according to an embodiment will be described. Each node device holds a routing table using a DHT (Distributed Hash Table). This routing table may prescribe transfer destinations of various types of control messages in the information communicating system S. The control message may be a message for controlling the operation of the peer-to-peer information communicating system. In other words, the control message may be a message to be used for content search or content acquisition. Further, the control message may be a message that is sent or received according to the routing table of the DHT. Specifically, in the routing table, a plurality of node information including node IDs of the node devices which are properly space apart from one another in the ID space, IP addresses, and port numbers may be registered. One node device that is connected to the information communicating system S may store node information of minimum necessary node devices as the routing table. By transferring control messages between the node devices, node information on the node devices that do not store the node information may be acquired. Further, by transmitting and receiving the control messages through the respective node devices, the information communicating system S can operate as a peer-to-peer information communicating system. On the other hand, since the DHT routing is well known in US2007283043 (A1), the detailed description thereof will be omitted. According to an embodiment, the first routing table for transmitting and receiving information through the first overly network OL and the second routing table for transmitting and receiving information through the second overlay network PL may be used.

Regarding Overview of a Content Acquisition Operation

In the information communicating system S, various kinds of content having different contents may be distributed to and stored in a plurality of node devices. The content may be granted a content name and a content ID that is unique identification information for content data through the center server SV. Attribution information of the content, such as the content name and the content ID, may be described in content catalog information. The content catalog information may be prepared by the center server SV, and may be sent to all node devices. Further, the content may be divided into a plurality of data. The divided data is called a "chunk".

<Process of Granting a Content ID>

If the content is input by the node device, the center server SV may grant a content ID to the input content. At this time, the granted content ID may be randomly generated by a node.

<Process of Dividing a Chunk>

In an embodiment, each chunk may be generated by dividing the content in a predetermined data size through the center server SV. In an embodiment, the minimum data size of the chunk may be 2 MB (Mega Bytes). Further, the maximum data size of the chunk may be 128 MB. However, as the result of division into chunks, some chunks may become smaller than 2 MB. Further, if the data size before division into chunks is smaller than 2 MB, the data size of the chunk may be smaller than 2 MB. In an embodiment, the content data may be divided into a plurality of chunks. However, as described in an embodiment, the content data may not be divided into a plurality of chunks. Non-divided content data may be applied to an embodiment of the present invention. Respective chunks may be distributed to and stored in the plurality of node devices. Through this, the content may be distributed to and stored in the plurality of node devices. The original of each chunk may be stored in the center server SV.

<Process of Granting a Chunk ID>

Each chunk may be granted a sequence number and a chunk ID through the center server SV. The sequence numbers, for example, correspond to an arrangement order when the plurality of divided chunks may be arranged to constitute the original content. The chunk ID may be unique identification information for each chunk.

<Process of Generating a Hash Value of a Chunk>

If the chunk ID is granted, the center server SV may generates a hash value of the chunk. The hash value may be generated using a predetermined hash function. The hash value, for example, is used to check falsification of the chunk or the like.

<Process of Generating a Meta-Information File>

If the chunk ID and the hash value of the chunk are generated, the center server SV may generate a meta-information file. The meta-information file may be information for searching for content that is composed of divided chunks. The meta-information file may include a granted chunk ID, a sequence number, and a hash value of the chunk. Further, the meta-information file may include a content ID of the content composed of divided chunks, which is granted by the center server SV. Each node device may acquire a meta-information file if a content ID of an arbitrary content is acquired. Specifically, on the basis of the content ID granted in the meta-information file, the node device may acquire the meta-information file. If the meta-information file is acquired, the node device may acquire the chunk ID included in the meta-information file. On the basis of the acquired chunk ID, the node device may acquire the chunk of the content. Through this, the node device can acquire the chunk ID of each chunk constituting the content in association with its sequence number.

On the other hand, the node device that may store the chunk according to an embodiment is called a "content holding node". Further, the location of the chunk may be stored by the node device that manages or stores the location of the chunk as index information. Hereinafter, the node device that manages the location of the chunk is called a "root node". The index information may include a set of node information of the node device that stores the chunk and the chunk ID of the chunk. Such a root node, for example, may be determined so that the root node becomes a node having a node ID that is most close to the chunk ID. The node ID that is most close to the chunk ID, for example, may be a node ID that most matches the significant digits of the ID.

If the meta-information file is generated through the above-described process, the center server SV may store the meta-information file. Then, the meta-information file that is stored by the center server SV may be stored in one of the plurality of node devices.

<Detailed Description of a Content Acquisition Operation>

Hereinafter, the details of the content acquisition operation according to an embodiment will be described. If a user of an arbitrary node device intends to acquire desired content, the node device may search for content holding nodes that store respective chunks constituting the desired content. Hereinafter, a node device of which a user desires to acquire a chunk is called a "user node". Specifically, the user node may transmit a search message. This search message may include a content ID of content of which the acquisition is desired and node information of a user node. This search message may be sent to another node device according to a DHT routing table stored in the user node. That is, the user node may transmit the search message toward the root node. Through this, the search message finally may reach the root node through the DHT routing having the content ID as a key. On the other hand, since the DHT routing is known in US2007283043 (A1), the detailed description thereof will be omitted.

The root node that has received the search message may acquire one or plural index information corresponding to the content ID included in the search message from an index information cache. The acquired index information may be returned to the user node that is a transmission source of the search message on the basis of the node information of the user node. The user node, which has acquired the index information through this, may acquire or download the meta-information file that corresponds to the content ID on the basis of the index information. Specifically, the user node may transmit a content request message to the content holding node on the basis of an IP address and a port number of the content holding node that is included in the index information. The content request message may include node information of a user node and a content ID of desired content. If the content request message is received, the content holding node may transmit or upload the meta-information file that corresponds to the content ID included in the content request message to the user node. On the other hand, if the content holding node that stores a desired meta-information file does not exist, the user node may be unable to acquire the index information of the content holding node. In this case, the user node may acquire the meta-information file from the center server SV.

The root node may transmit a content transmission request message to the content holding node listed in the IP address or the like that is included in the index information. The content transmission request message may include node information of a transmission source of the content request message. The content holding node, which has received the content transmission request, may start transmission or uploading of the meta-information file to the user node that is indicated by the node information included in the received message. Through this, the user node can acquire the meta-information file from the content holding node.

If the user node acquires and stores the meta-information file from the content holding node, the user node may publish the meta-information file. To publish the meta-information file means that the user node informs the root node that the user node stores the meta-information file as the content holding node. By publishing the meta-information file, it may become possible for another node device to acquire the published meta-information file from the content holding node that has published the meta-information file. Specifically, the user node that stores the meta-information file may transmit the publish message. The publish message may include the content ID of the meta-information file and node information of the user node that stores the meta-information file. The publish message may be sent toward the root node. Through this, the publish message, in the same manner as the search message, may reach the root node through the DHT routing having the content ID as a key. The root node may store the index information, which includes a set of the node information included in the received publish message and the content ID, in the index information cache. Through this, the user node newly may become a content holding node that stores the meta-information file.

If the meta-information file is acquired, the user node may transmit a chunk search message on the basis of a chunk ID included in the acquired meta-information file. The chunk search message may include the chunk ID and the node information of the user node. The chunk search message may be sent to another node device according to the DHT routing table stored in the user node. That is, the user node may transmit the chunk search message toward the root node of the chunk. Through this, the chunk search message finally may reach the root node of the chunk through the DHT routing having the chunk ID as a key. On the other hand, since the DHT routing is known in US2007283043 (A1), the detailed description thereof will be omitted.

The root node that has received the chunk search message may acquire one or plural index information corresponding to the chunk ID included in the chunk search message from the index information cache. The acquired index information may be returned to the user node that is a transmission source of the chunk search message on the basis of the node information of the user node. The user node, which has acquired the index information through this, may acquire or downloads the chunk on the basis of the index information. Specifically, the user node may transmit a chunk request message to the content holding node on the basis of an IP address and a port number of the content holding node that is included in the index information. The chunk request message may include node information of a user node and a chunk ID of the chunk of which the acquisition is desired. The content holding node that has received the chunk request message may transmit or upload the chunk that corresponds to the chunk ID included in the chunk request message to the user node. On the other hand, if the content holding node that stores a desired chunk does not exist, the user node may be unable to acquire the index information of the content holding node. In this case, the user node may acquire the chunk from the center server SV.

The root node may transmit a chunk transmission request message to the content holding node listed in the IP address or the like that is included in the index information. The chunk transmission request message may include node information of a transmission source of the chunk request message. The content holding node, which has received the chunk transmission request, may start transmission or uploading of the chunk to the user node that is indicated by the node information included in the received message. Through this, the user node can acquire the chunk from the content holding node.

If the user node acquires and stores the chunk from the content holding node, the user node may publish the chunk. To publish the chunk means that the user node informs the root node that the user node stores the chunk as the content holding node. By publishing the chunk, it may become possible for another node device to acquire the published chunk from the content holding node that has published the chunk. Specifically, the user node that stores the chunk may transmit the publish message. The publish message may include the chunk ID of the chunk and node information of the user node that stores the chunk. The publish message may be sent toward the root node of the chunk. Through this, the publish message, in the same manner as the search message, may reach the root node through the DHT routing having the chunk ID as a key. The root node may store the index information, which includes a set of the node information included in the received publish message and the chunk ID, in the index information cache. Through this, the user node newly may become a content holding node that stores the chunk.

Electrical Configuration of a Broadband Router BR

Figure 3:
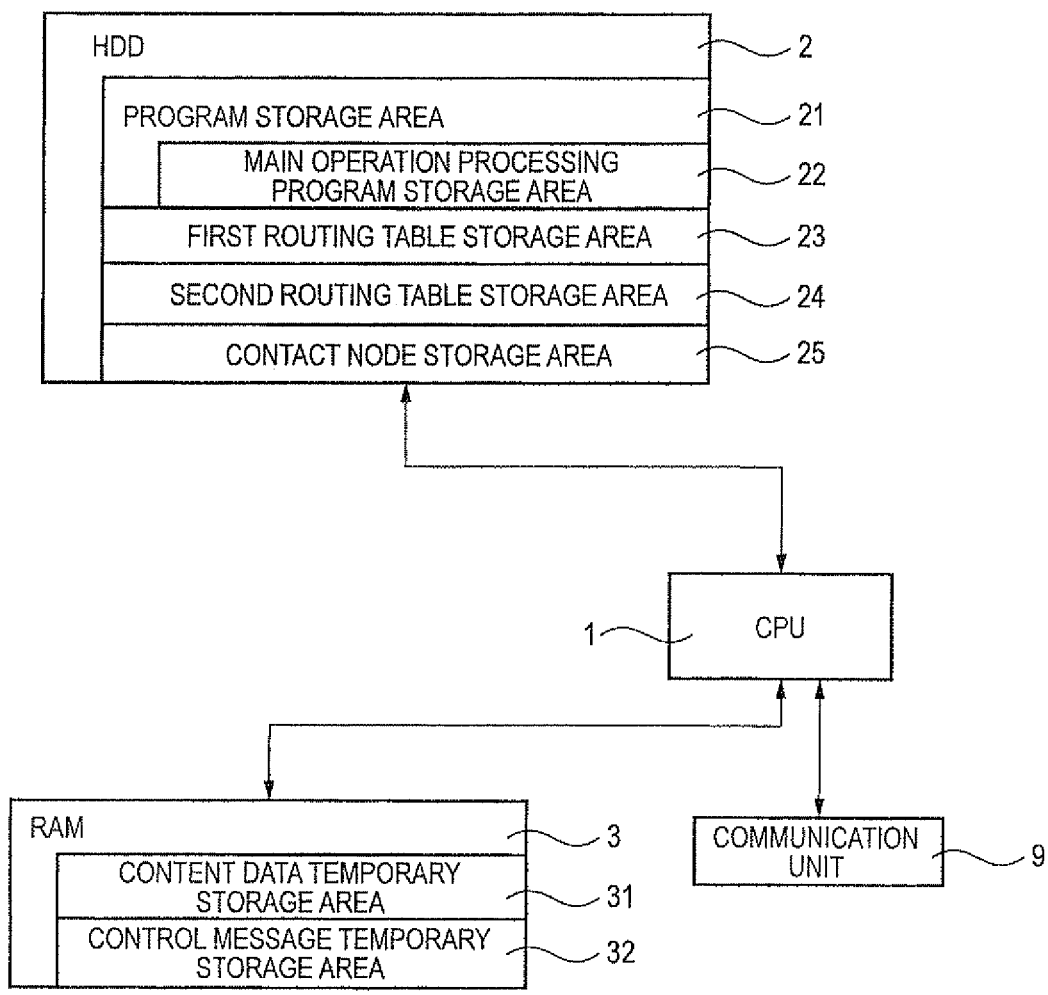
FIG. 3 is a block diagram illustrating an electrical configuration of a broadband router BR according to an embodiment of the present invention.

Then, referring to FIG. 3, the electrical configuration of the broadband router BR will be described. As shown in FIG. 3, the broadband router BR according to an embodiment of the present invention may include a CPU 1 to control the broadband router BR. The CPU 1 may be electrically connected to a HDD 2, a RAM 3, and a communication unit 9. A computer of the broadband router BR may perform a counting operation. Through the counting operation, the broadband router BR can measure the time. The CPU 1, the HDD 2, the RAM 3, and the communication unit 9 may be connected to one another through a bus. In addition to the broadband router BR, the above-described configuration can be applied to a PC, a STB (Set Top Box), a firewall, and the like.

The HDD 2 may include a program storage area 21, a first routing table storage area 23, a second routing table storage area 24, and a contact node storage area 25. The program storage area 21 may include a main operation processing program storage area 22. The main operation processing program storage area 22 may store a main operation processing program. The main operation processing program may be a program that makes the broadband router BR perform the main operation process. On the other hand, the main operation processing program of the broadband router BR may be downloaded from a predetermined server on the network NW or may be read from a recording medium, for example, such as CD-ROM, through a drive of the recording medium.

The first routing table storage area 23 may store a first routing table according to an embodiment. The second routing table storage area 24 may store a second routing table according to an embodiment. The contact node storage area 25 may store IP addresses of the first contact node and the second contact node. The IP addresses of the first contact node and the second contact node, which are indicated as IPv4 and IPv6, may be stored in the contact node storage area 25. A participation message may be sent on the basis of the IP addresses of the first contact node and the second contact node stored in the contact node storage area 25. On the other hand, the IP addresses of the first contact node and the second contact node may be pre-stored or may be acquired along with the main operation processing program being downloaded. On the other hand, if a communicable center server SV is installed through both IPv4 and IPv6, instead of the first contact node and the second contact node, the IPv4 IP address and the IPv6 IP address of the center server SV may be stored in the contact node storage area 25.

RAM 3 may include a content data temporary storage area 31 and a control message temporary storage area 32. The content data temporary storage area 31 temporarily may store the content data, which is sent or received from the overlay network OL or the overlay network PL, in association with the content ID. Instead of the RAM 3, a storage device such as a known flash memory may be used.

The control message temporarily storage area 32 temporarily may store control messages for controlling the information communicating system S.

The communication unit 9 may perform a communication control of information with an external device through the network NW.

The broadband router BR may receive the content, chunk, or meta-information file that is sent in response to the request through the communication unit 9. In an embodiment, the content, chunk, or meta-information file may be packetized to be sent. Each packet may be received through the communication unit 9, and temporarily stored in the content data temporary storage area 31 of the RAM 3. The content stored in the RAM 3 may be read from the RAM 3 and stored in the HDD 2. Further, the content data may be directly stored in the HDD 2 without passing through the RAM 3.

Main Operation of a Broadband Router BR

The operation and effect of the broadband router BR as configured above according to an embodiment will be described with reference to FIG. 4. First, the operation and effect of the broadband router BR will be described with reference to the accompanying drawing. The main operation of the broadband router BR is performed through connection of the broadband router BR to a power supply or an external power supply such as the commercial power supply through the electric outlet. The process shown in the following is performed by the CPU 1.

First, in step S101, it is determined whether or not communication is possible over IPv4. Specifically, a predetermined message may be sent on the basis of the IP address of the first contact node stored in the contact node storage area 25. If communication with the first contact node is possible as the result of transmitting the message, it may be determined that communication is possible over IPv4. If it is determined that communication is possible over IPv4 ("YES" in step S101), step S102 is performed. If it is not determined that communication is possible over IPv4 ("NO" in step S101), step S105 is performed. On the other hand, whether or not communication is possible over IPv4 may be determined using a setup file or the like preset in the node device.

In step S102, it is determined whether or not communication is possible over IPv6. Specifically, a predetermined message may be sent on the basis of the IP address of the second contact node stored in the contact node storage area 25. If communication with the second contact node is possible as the result of transmitting the message, it may be determined that communication is possible over IPv6. If it is determined that communication is possible over IPv6 ("YES" in step S102), step S103 is performed. If it is not determined that communication is possible over IPv6 ("NO" in step S102), step S104 is performed. On the other hand, whether or not communication is possible over IPv6 may be determined using a setup file or the like preset in the node device.

In step S103, according to a predetermined priority order, a process of participating in one overlay network of IPv4 and IPv6 is performed. In an embodiment of the present invention, IPv4 has a higher priority than IPv6, a participation message is sent to the first contact node of the first overlay network OL. Further, the first routing table that is acquired from the first contact node is stored in the first routing table storage area 23.

In step S104, a participation message is sent to the first contact node of the first overlay network OL that is communicable over IPv4. Further, the first routing table that may be acquired from the first contact node is stored in the first routing table storage area 23.

In step S105, it is determined whether or not communication is possible over IPv6. Specifically, a predetermined message may be sent on the basis of the IP address of the second contact node stored in the contact node storage area 25. If communication with the second contact node is possible as the result of transmitting the message, it is determined that communication is possible over IPv6. If it is determined that communication is possible over IPv6 ("YES" in step S105), step S106 is performed. If it is not determined that communication is possible over IPv6 ("NO" in step S105), step S107 is performed. On the other hand, whether or not communication is possible over IPv6 may be determined using a setup file or the like preset in the node device.

In step S106, a participation message is sent to the second contact node of the second overlay network PL that is communicable over IPv6. Further, the second routing table that is acquired from the second contact node may be stored in the second routing table storage area 24.

In step S107, failure of the participation process is notified.

In step S108, it is determined whether or not the control message is received. If it is determined that the control message is received ("YES" in step S108), step S109 is performed. If it is not determined that the control message is received ("NO" in step S108), step S113 is performed.

In step S109, the control message received in step S108 is temporarily stored in the control message temporary storage area 32. Further, the IP address of the node device of the transmission source of the control message that is received in step S108 may be temporarily stored in the control message temporary storage area 32 in association with the control message.

In step S110, on the basis of the IP address that is temporarily stored in step S109, it is determined whether or not the Internet protocol of the node device of the transmission source of the control message coincides with the Internet protocol of the participating overlay network. Specifically, on the basis of the IP address that is temporarily stored in step S109, it is determined whether the node device of the transmission source is communicable over IPv4 or IPv6. Further, if the first routing table is stored in the first routing table storage area 23, it may be determined that the Internet protocol of the participating overlay network is IPv4. On the other hand, if the second routing table is stored in the second routing table storage area 24, it may be determined that the Internet protocol of the participating overlay network is IPv6. It may be determined whether or not the Internet protocol of the transmission source of the control message that is determined as described above coincides with the Internet protocol of the participating overlay network. If it is determined that the Internet protocols coincide with each other ("YES" in step S110), step S111 is performed. If it is not determined that the Internet protocols do not coincide with each other ("NO" in step S110), step S112 is performed.

In step S111, the control message is sent. Specifically, the routing table that corresponds to the Internet protocols determined to coincide with each other in step S110 is determined. In step S110, if it is determined that the Internet protocols coincide with each other over IPv4, the first routing table is determined. On the other hand, in step S110, if it is determined that the Internet protocols coincide with each other over IPv6, the second routing table is determined. According to the determined routing table, the control message may be sent.

In step S112, the control message is discarded. Specifically, according to an embodiment, the control message that is temporarily stored in the control message temporary storage area 32 may be deleted. In addition to the deletion, it may be set that the control message that is temporarily stored in the control message temporary storage area 32 may become invisible. Further, it may be set that the control message that is temporarily stored in the control message temporary storage area 32 is unable to be sent.

In step S113, it is determined whether or not the power of the broadband router BR is turned off. If it is determined that the power is turned off ("YES" in step S113), the main operation process is terminated. If it is not determined that the power is turned off ("NO" in step S113), step S108 is performed.

According to an embodiment, the peer-to-peer communication system using the DHT routing table is applied to the first overlay network OL or the second overlay network PL. However, the embodiment is not limited thereto, but the system may be another peer-to-peer communication system or a system using the overlay network. For example, a communication system or a peer-to-peer communication system using a routing table except for the DHT may be used. The peer-to-peer communication system that does not use the DHT may be, for example, a hybrid peer-to-peer communication system. The hybrid peer-to-peer communication system or a pure type peer-to-peer communication system may be used.

According to an embodiment, the broadband router BR is used as an example. However, the embodiment is not limited thereto, but the terminal device Tm-n according to the embodiment of the present invention may be used as the node device. The first overlay network OL or the second overlay network PL may be configured by the terminal devices Tm-n connected to the respective points or the terminal devices Tm-n that are directly connectable to the network NW. In this case, the terminal devices Tm-n may become communicable through one or both of IPv4 and IPv6.

Figure 4:
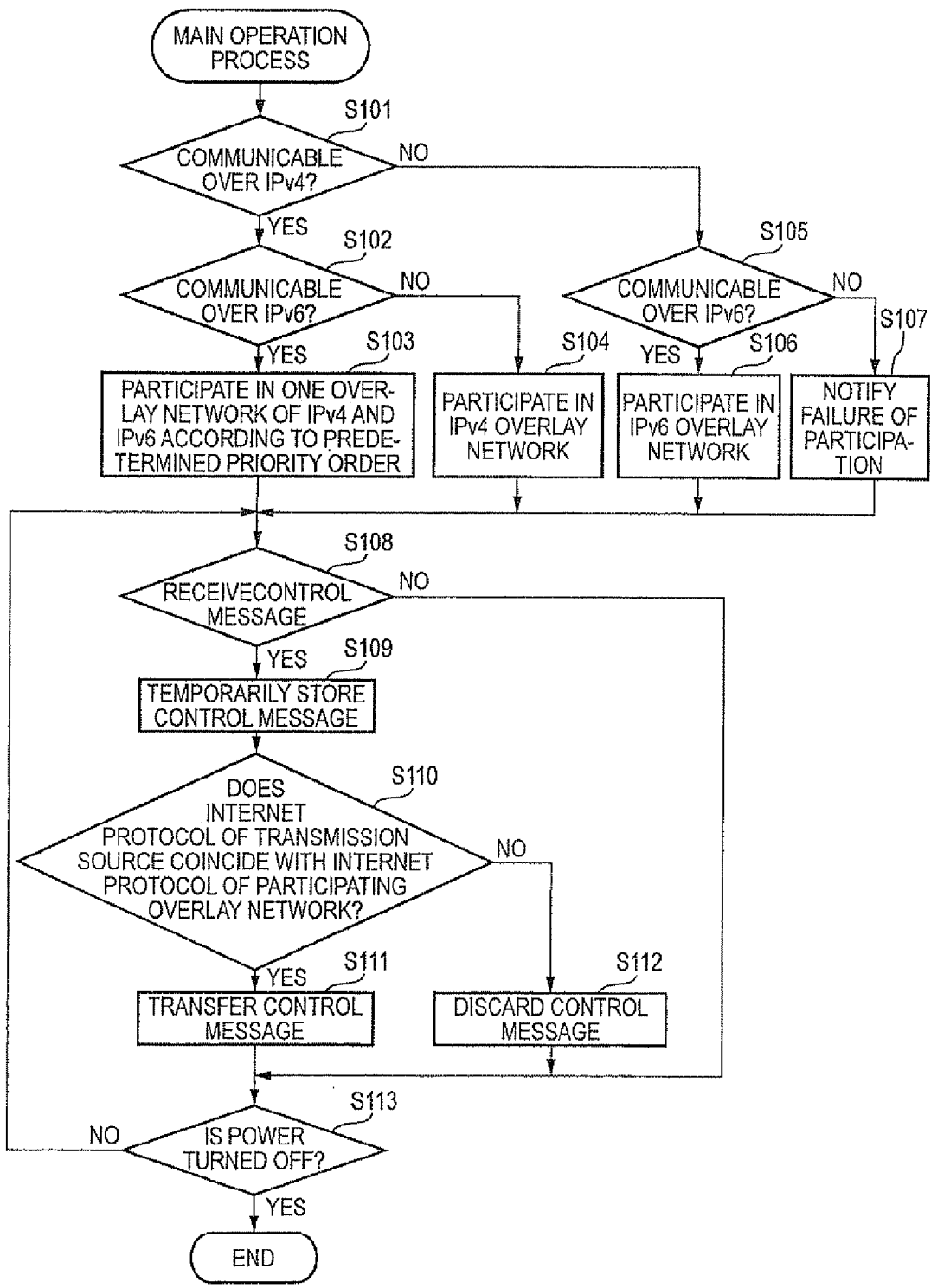
FIG. 4 is a flowchart illustrating a processing procedure of the main operation of the broadband router BR according to an embodiment of the present invention.

Further, in step S113 in FIG. 4 according to an embodiment, it is determined whether or not the power is turned off. In addition to the determination whether or not the power is turned off, it may be determined whether or not there is a withdrawal instruction from the overlay network. If it is determined that there is a withdrawal instruction from the overlay network, in the same manner as in step S113 in FIG. 4, the main operation process may be terminated. On the other hand, if it is not determined that there is a withdrawal instruction from the overlay network, in the same manner as in step S113 in FIG. 4, the step S108 may be performed again. In the case where it is determined whether or not there is a withdrawal instruction in step S113, the main operation process may be performed on the basis of the participation instruction in the overlay network.

What is claimed is:

1. A node device comprising a controller configured to:
   determine whether or not the node device is communicable over IPv4 (Internet Protocol Version 4);
   determine whether or not the node device is communicable over IPv6 (Internet Protocol Version 6);
   acquire a first routing table that is generated using information of a first node device communicable over the IPv4 from a predetermined device via a network, if the controller determines that communication is possible over the IPv4;
   acquire a second routing table that is generated using information of a second node device communicable over the IPv6 from the predetermined device via the network if the controller determines that communication is possible over IPv6;
   control transmitting and receiving of a message for controlling a communication system using the acquired one of the first routing table and the second routing table; and
   receive at least one of a first message that is sent or received using the first routing table and a second message that is sent or received using the second routing table,
   wherein if the controller determines that communication is possible over the IPv4 and the controller determines that communication is possible over the IPv6, the controller (i) acquires one of the first routing table and the second routing table according to a priority order, the controller determining either the first routing table or second routing table based on the priority order, and (ii) does not perform the transmission of the message which is received using a different routing table from the determined routing table between the first routing table and the second routing table.

2. The node device according to claim 1,
   wherein the first routing table that is communicable in a first overlay network configured by a plurality of node devices communicable over IPv4,
   wherein the second routing table that is communicable in a second overlay network configured by a plurality of node devices communicable over IPv6,
   wherein the controller acquires either the first routing table or the second routing table comprising high communication load based on a comparison with a communication load of the first overlay network and a communication load of the second overlay network, as the priority order.

3. The node device according to claim 1, wherein:
   the communication system includes:
      a first contact node configured to receive a request to participate in a first overlay network configured by a plurality of node devices communicable over the IPv4 from a participating node device that intends to participate in the communication system; and
      a second contact node receiving a request to participate in a second overlay network configured by a plurality of node devices communicable over the IPv6 from the participating node device,
   the controller of the node device is configured to:
      store location information indicating locations of the networks of the first contact node and the second contact node; and
      request a connection to the first contact node and the second contact node on the basis of the location information,
   the controller determines that communication is possible over the IPv4 if the node device can connect to the first contact node based on the request, and the controller determines that communication is possible over the IPv6 if the node device can connect to the second contact node based on the request.

4. The node device according to claim 1, wherein for the priority order, the IPv4 has a higher priority than the IPv6.

5. The node device according to claim 1, wherein the priority order is dynamically changed.

6. The node device according to claim 5, wherein the priority order is set based on the number of the node devices connected to the communication system.

7. A non-transitory computer readable recording medium storing a program causing a computer of a node device to execute:

determining whether or not the node device is communicable over IPv4 (Internet Protocol Version 4);

determining whether or not the node device is communicable over IPv6 (Internet Protocol Version 6); and acquiring one of a first routing table that is generated using information of a first node device communicable over the IPv4 and a second routing table that is generated using information of a second node device communicable over the IPv6 from a predetermined device via a network according to a predetermined priority order in response to determining that communication is possible over the IPv4 and determining that communication is possible over the IPv6, controlling transmitting and receiving of a message for controlling a communication system using the acquired one of the first routing table and the second routing table; and receiving at least one of a first message that is sent or received using the first routing table and a second message that is sent or received using the second routing table, wherein in response to determining that communication is possible over the IPv4 and determining that communication is possible over the IPv6, preventing performing the transmission of the message which is received using a different routing table from the determined routing table between the first routing table and the second routing table.

8. An information communication method, comprising:

determining whether or not the node a first node device is communicable over IPv4 (Internet Protocol Version 4);

determining whether or not the node a second node device is communicable over IPv6 (Internet Protocol Version 6); and acquiring one of a first routing table that is generated using information of a first node device communicable over the IPv4 and a second routing table that is generated using information of the second node device communicable over the IPv6 from a predetermined device via a network according to a predetermined priority order in response to determining that communication is possible over the IPv4 and determining that communication is possible over the IPv6, controlling transmitting and receiving of a message for controlling a communication system using the acquired one of the first routing table and the second routing table; and receiving at least one of a first message that is sent or received using the first routing table and a second message that is sent or received using the second routing table, wherein in response to determining that communication is possible over the IPv4 and determining that communication is possible over the IPv6, preventing performing the transmission of the message which is received using a different routing table from the determined routing table between the first routing table and the second routing table.

\* \* \* \* \*